United States Patent [19]
Hobby

[11] Patent Number: 5,503,656
[45] Date of Patent: Apr. 2, 1996

[54] METAL RECOVERY AND RECYCLING METHOD AND SYSTEM

[76] Inventor: Michael M. Hobby, P.O. Box 726, Coto Laural, Puerto Rico, 00780

[21] Appl. No.: 333,742

[22] Filed: Nov. 3, 1994

Related U.S. Application Data

[63] Continuation of Ser. No. 730,175, Jul. 16, 1991, abandoned.

[51] Int. Cl.$^6$ .................................................. C22B 3/04
[52] U.S. Cl. ............................. 75/712; 75/743; 75/744; 405/129; 588/236
[58] Field of Search .......................... 75/712, 743, 744; 405/129; 588/236

[56] References Cited

U.S. PATENT DOCUMENTS

| | | | |
|---|---|---|---|
| 4,739,973 | 4/1988 | Herndon | 266/170 |
| 4,919,570 | 4/1990 | Payne | 405/128 |
| 4,948,476 | 8/1990 | Kamperman et al. | 204/234 |
| 5,108,498 | 4/1992 | Dumont | 423/DIG. 20 |

FOREIGN PATENT DOCUMENTS

| | | | |
|---|---|---|---|
| 278282 | 8/1988 | European Pat. Off. | 266/170 |
| 103281 | 4/1990 | Japan | 405/128 |

*Primary Examiner*—Melvyn Andrews

[57] ABSTRACT

A system and method for recovering metal contaminants from soil, including a leaching subsystem and a metal recovery system.

20 Claims, 5 Drawing Sheets

METAL RECOVERY AND RECYCLING METHOD AND SYSTEM

This application is a continuation of Ser. No. 07/730,175 filed Jul. 16, 1991 now abandoned.

INTRODUCTION

My invention relates to systems and methods for recovering metal contaminants from metal-contaminated soil. Contamination of soil with a variety of metals has been the consequence of many industrial processes. Metal contaminants in soil present a serious environmental and health hazard and are increasingly becoming the subject of government regulation. Thus there is a compelling need for an effective method for eliminating the hazard posed by metal-contaminated soil.

Methods currently used for treating or disposing of metal-contaminated soil include storing the soil in contained landfills or fixing the metals in the soil to prevent them from leaching out to contaminate soil water or other soil. My invention provides for the removal of metal contaminants from soil. Virtually total removal of metal contaminants can be achieved with the use of my invention. Furthermore, the metals recovered from soil using my inventive method and system are in an easily recycled form. Not only can the metals recovered from soil be of considerable economic value, recycling eliminates the generation of waste metals. My inventive system can be portable so that metal recovery and recycling can be performed at the contaminated site, eliminating the need for transporting contaminated materials, which can be both hazardous and expensive.

As used herein and in the claims, the term "metal contaminant" shall mean a metal which has contaminated the soil as a result of an act of man (for example as a result of an industrial process). My invention is applicable to soils contaminated by such metal contaminants (as distinguished from naturally-occurring metals in the soil). For example, my invention does not apply to the leaching of precious or valuable metals from ores. The claims appended hereto, should be construed in accordance with the foregoing.

One objective of my invention is to provide an effective and economical means for removing metal contaminants from soil.

Another objective of my invention is to make available a transportable unit which can be used for treating metal-contaminated soil on-site.

Another objective of my invention is to recover metal contaminants from contaminated soil for recycling.

Another objective of my invention is to eliminate the need to dispose of metal-contaminated soil in hazardous waste facilities.

These objectives and other objectives, advantages and aspects of my invention are further described below.

SUMMARY OF INVENTION

The invention described herein comprises a system and method for recovering metal contaminants from soil. My invention includes: (a) subjecting contaminated soil to a leaching solution effective for the leaching of metal contaminant from the soil (i.e. to bring the metal contaminant into leaching solution, and (b) separating the metal contaminant from the leaching solution. The separation can be accomplished, for example, by a chemical or electrical separation followed by a physical separation. For example, the metal contaminant can be separated from the leaching solution by precipitation (a chemical separation) and then the precipitated metal contaminant can be physically separated from the leaching solution by a filter press (a physical separation). Following separation, the leaching solution can be returned (recirculated) for additional separation of residual metal contaminant from the leaching solution. This can be repeated until the concentration of metal contaminant has been reduced to a desired level (i.e. a target level determined by the practitioner which may be, for example, a concentration needed to comply with applicable environmental laws or regulations). When the concentration of metal contaminant has been sufficiently reduced, the leaching solution can be disposed of or used for further treatment of contaminated soil.

A closed-loop configuration allows leaching solutions through the system to accomplish efficient and virtually complete recovery of metal contaminant from contaminated soil. My inventive method and system were designed specifically for use in the recovery and recycling of industrial metal contaminants from contaminated soil. My system can be portable and can make use of non-hazardous organic and inorganic reagents to achieve efficient recovery of metal contaminants without the generation of additional hazardous waste. Metals which can be recovered with the use of my invention include, but are not limited to, barium, cadmium, chromium, copper, iron, lead, mercury, nickel, selenium and silver.

The leaching solution can be cycled through the contaminated soil to maximize the amount of contaminant which is removed. This cycling can be accomplished through the use of two or more basins. Once the metal recovery and recycling process is completed the pH of the decontaminated soil and residual leaching solution is neutralized so the soil can be safely returned to its original location. The recovered metal contaminant, e.g. precipitate, which contains metals in high concentrations, can be sold to a metal recycler.

DETAILED DESCRIPTION

1. System Configuration

The inventive system is comprised of two principal subsystems. The first subsystem is a leaching subsystem comprised of one or more basins in which metal contaminated soil is placed. The leaching process used to remove metal contaminants from the contaminated soil is carried out within this leaching subsystem. Several different basin configurations can be used in the leaching subsystem. The second subsystem is a metal recovery subsystem and is comprised of the components or means used to recover metal contaminants from the leaching solution. The recovered metals can be in the form of a metallic sludge suitable for recycling. Several configurations can be used for the second subsystem, as will be described below.

Figure 1:
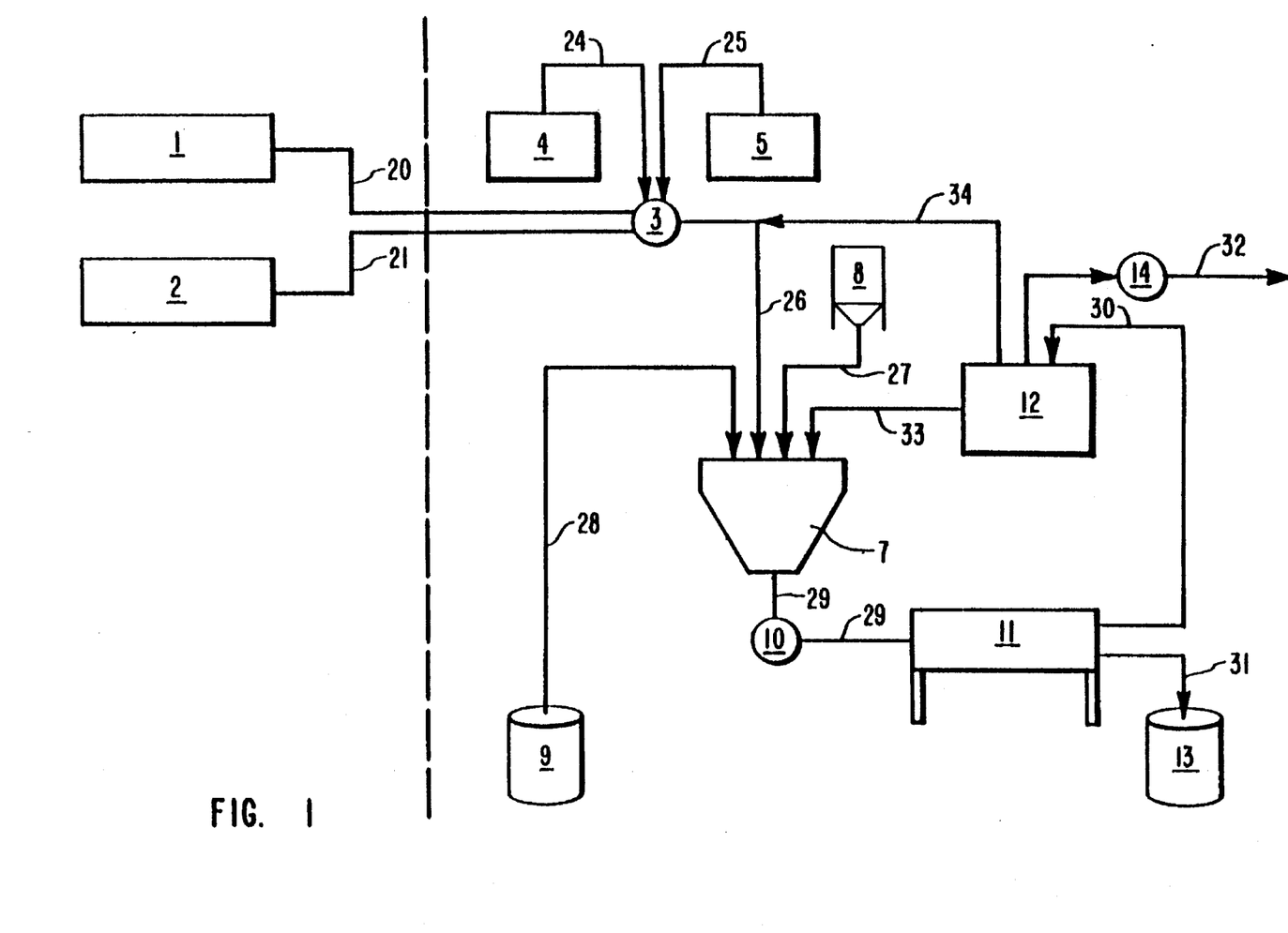
FIG. 1 diagrams the process flow for the preferred embodiment of the inventive system.

An embodiment of the basic system configuration is depicted in FIG. 1. A soil contaminated with a metal contaminant is placed in initial basin 1 and swap basin 2. (Note that this description of my invention and the appended claims are also applicable to the decontamination of a soil contaminated with more than one metal contaminant. In such case, the metal contaminant is a plurality of metal contaminants). Basins 1 and 2 can be any container for containing the contaminated soil.

Figure 3:
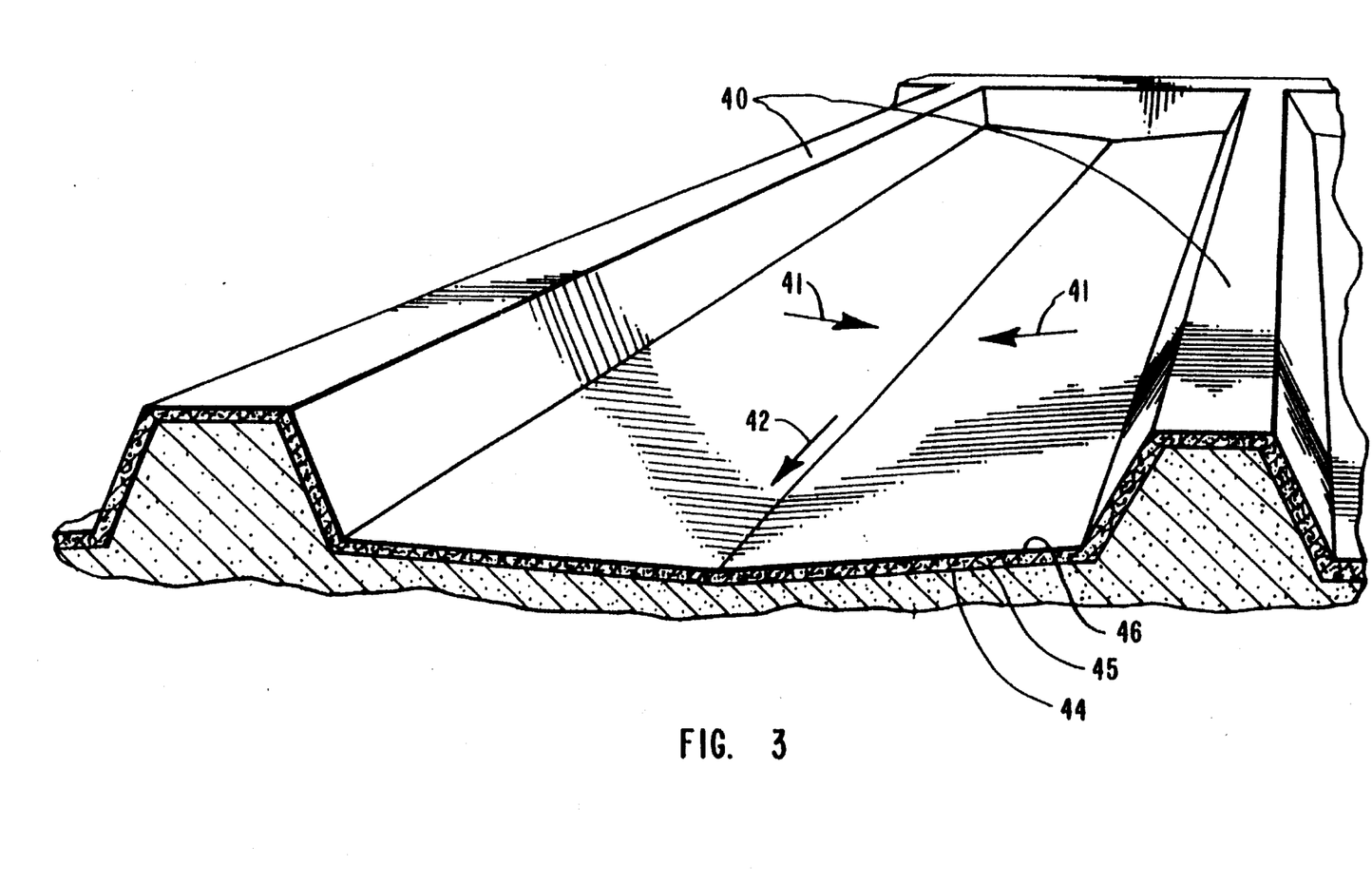
FIG. 3 illustrates the plumbing configuration used with the basin tanks used to contain the contaminated soil during treatment.

The basins can be constructed in the basin resulting from the excavation of the contaminated soil. The size and proportions of the basins are determined according to the amount of contaminated soil. A cross sectional view of a basin is shown in FIG. 3. The basin (approximately 25 ft. by 225 ft.) is surrounded by berms 40 (dirt embankments) built approximately 8 feet high at roughly a 1:2 slope. The lower surfaces of the basin slope toward the center line in direction 41 at roughly 3 degrees, and slope at an angle of 1 to 3 degrees along the longitudinal axis (direction 42) toward a sump located at the down-gradient end of the basin. The sump is comprised of a slotted collection line positioned between liners 44 and 46. A sump pump can draw or drain solution which may leak (e.g. through an accidental puncture) through liner 46. The basin is lined with sub-liner 44 which is made of 20 mil polyvinylchloride (PVC). Sub-liner 44 is covered with a six inch layer of coarse sand 45. Sand layer 45 is covered by a primary liner 46 which is also made of 20 mil PVC. Sand layer 45 provides a route by which leaching solutions may flow toward the sump should primary liner 46 fail.

Before the leaching solution is added to the basins, the integrity of the basin liners should be tested as follows. Initial basin 1 is filled with water, and 24 hours are allowed to pass so that the appearance of any water leaks from primary liner 46 can be detected. If after 24 hours no leaks have appeared, the water is pumped to the next basin in the series (in this case to swap basin 2), and the basin is observed for a 24 hour period to detect leaks. This process is repeated for all basins in the system.

Figure 2:
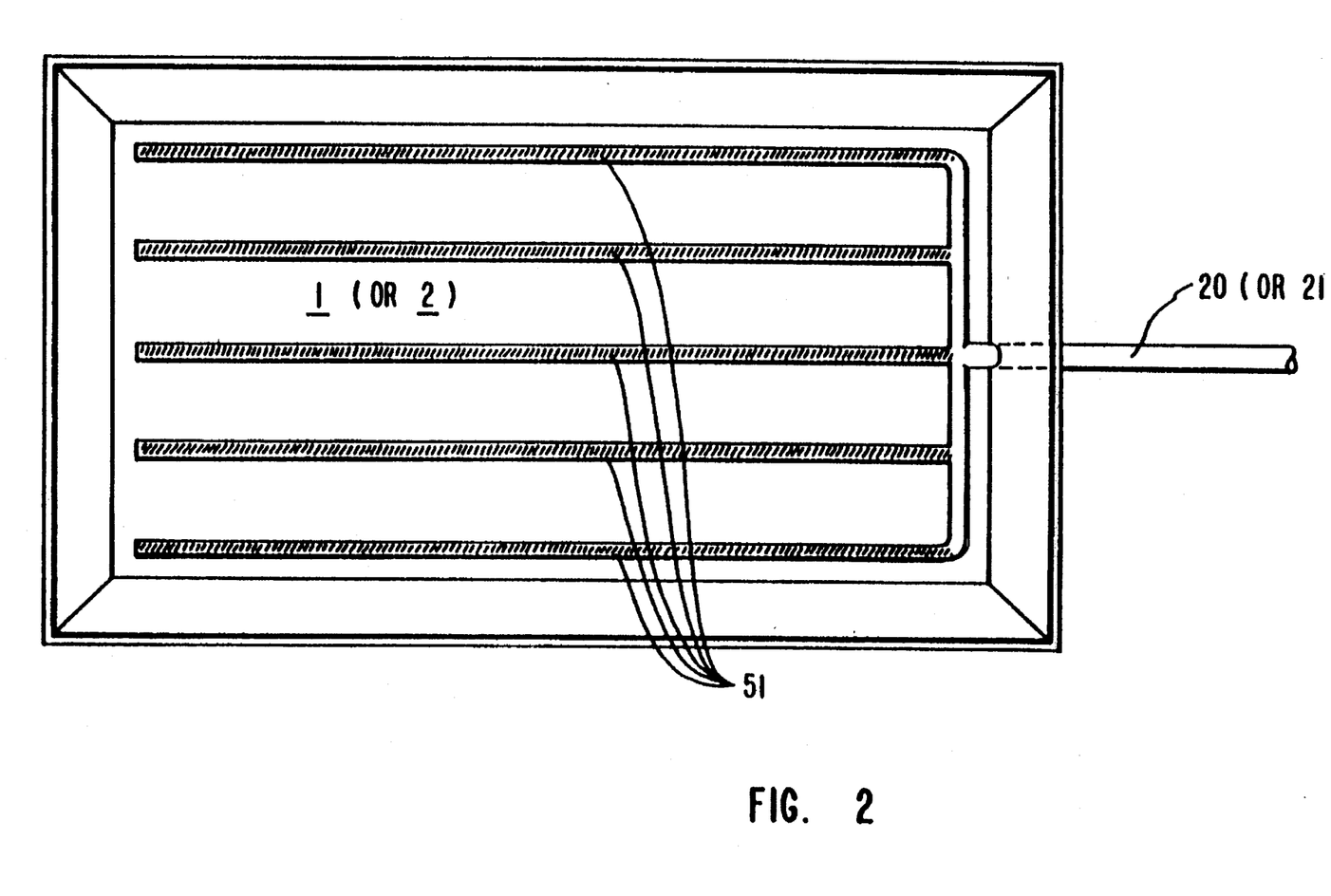
FIG. 2 is a cross-sectional view of a basin tank illustrating tank construction.

The preferred plumbing configuration for the subsurface type of basin described above is shown in FIG. 2. Two to four inch slotted PVC or stainless steel pipes 51 lie parallel to the longitudinal axis of basin 1 (or 2). The number and size of slotted pipes and slots which should be used in the invention depend on the dimensions of the basin and the grain size of the soil being treated. This determination is within the knowledge and expertise of a practitioner skilled in the art. Slotted pipes 51 are placed at the bottom of basin 1 (and 2) on top of primary liner 46. Slotted pipes 51 join line 20 (or 21) at the end of the basin. Leaching solution can be introduced to the basin via line 20 (or 21) and can be transferred from the basin to the metal recovery subsystem (described below) via line 20 (or 21). Line 20 (and 21) and slotted pipes 51 are used for both influent and effluent leaching solutions.

Although it is preferred that basins be prepared in the area from which the contaminated soil is removed, in cases in which there is insufficient space on the site, or the soil water is too close to the surface, or for other reasons, portable above-ground tanks can be used as the basins. In such cases I recommend the use of open, rectangular tanks which can be field-erected from eight-foot sections. Such tanks are available from International Remediation Corporation. My invention is not limited to said basins or tanks, and other types of basins, which may be constructed or purchased from various other suppliers, can also be effective for use in my inventive system. The portable above-ground tanks can be attached to the plumbing for the system in the same manner as the in-ground basins.

As shown in FIG. 1, water is pumped into initial basin 1 by pump 3 from water supply 4, via lines 24 and 20. The water can contain an anti-complexing agent such as hydrogen peroxide. A leaching agent is pumped into basin 1 by pump 3 from leaching agent storage tank 5 via lines 25 and 20. During the metal recovery process, which is described in greater detail below, leaching solution is transferred between initial basin 1 to swap basin 2 via lines 20 and 21. Leaching solution is pumped between the two basins by pump 3. It is preferred that at least two basins be used in the practice of my invention. Depending on the size of the site and the quantity of contaminated soil, it may be preferable to use more than two basins. If more than two basins are used, it is preferred that the total number of basins used be a multiple of two, and that the basins be paired such that one basin in the pair functions as an initial basin and the other basin functions as a swap basin. In other embodiments of my invention two or more swap basins can be used with the initial basin.

After the contaminated soil in the basins has been treated with the leaching solution, the leaching solution is removed from the leaching subsystem and introduced to the metal recovery subsystem for separating and recovering the metal contaminant.

It is preferred that the metal recovery subsystem be mounted on a trailer so that it can be easily transported to the site (and subsequently to other sites) for on-site decontamination purposes. However, if a mobile unit has insufficient capacity for decontaminating a larger site, or is unworkable for some other reason, the metal recovery subsystem can be assembled on-site. If the soil is a clay, it is desirable to use a mixer (e.g. a mixing chamber) as a basin for holding the clay. The mixer can mix the clay and the leaching solution can be introduced into the mixer. The following description addresses the individual components of the metal recovery subsystem and the relationship between different components, and is applicable to both mobile and site-installed metal recovery subsystems.

The metal recovery subsystem is a means for separating the metal contaminant from the leaching solution. The leaching solution is pumped from initial basin 1 to precipitation tank 7 by pump 3, via lines 20 and 26. (Alternatively, the leaching solution can be pumped from swap basin 2.) Precipitation tank 7 is a sloped tank that is sized to accommodate the volume of leaching solution being processed. The precipitation tank can be any other container suitable for the precipitation. In lieu of a precipitation tank, the precipitation can be accomplished in an in-line mixer. More broadly, any means for accomplishing the precipitation can be used. In this embodiment of my invention, a precipitation agent is added to the precipitation tank 7 from precipitation agent tank 8 via line 27. An organic reducing agent is introduced from organic reducing agent drum 9 via line 28. An air operated mixer in precipitation tank 7 stirs the leaching solution and causes the metal contaminant precipitates to remain suspended in the solution rather than settling out. After precipitation of the metal contaminant has taken place within precipitation tank 7, pump 10 is used to pump the leaching solution (in which precipitated metal contaminants are suspended) from said precipitation tank to filter press 11 via line 29. The filter press acts as a means for physically separating precipitated metal contaminant from the leaching solution.

In this embodiment of the invention, the separation of metal contaminant from the leaching solution is accomplished by precipitation (a chemical separation) and a filter press (a physical separation). Other means and methods of separation can be used in the practice of my invention. For example, other suitable chemical separation means and methods include organic complexing and ozonation (e.g. sparging of ozone through the solution to form metal oxides which can be physically separated). In lieu of a chemical separation, an electrical separation means or method can be used to separate metal contaminant from the leaching solution. For example, electrowinning can be used for this purpose. The physical separation can be accomplished by means other than a filter press. For example, any of the following can be used: centrifuge, cyclone, belt filter press, tube press, etc. Physical separation can also be accomplished by evaporation, decanting, etc.

The solution which passes through the filter press 11 is pumped to recirculation tank 12 (by pressure generated by Pump 10) via line 30. The metallic sludge filtrate which remains in filter press 11 is removed and transferred to recycling drum(s) 13 via line 31 for recycling of the metal contaminants.

The concentration of metal contaminant in the leaching solution in recirculation tank 12 is measured. Recirculation tank 12 provides an opportunity to measure the concentration of metal contaminant remaining in the leaching solution, to measure the pH of the leaching solution, and to adjust the pH. If the metal contaminant concentration has been reduced sufficiently (i.e. to a desired level), the leaching solution is pumped out of recirculation tank 12 with pump 14 via line 32 for disposal. Alternatively, the solution may be returned to the initial or swap basin 1 or 2 via lines, 34, 21, and 20, for further leaching. If the metal contaminant concentration does not meet standards (i.e. has not been reduced to a desired level), the water is returned to precipitation tank 7 via line 33 for further removal of contaminants by precipitation and separation.

2. Treatment Steps

It is recommended that the following steps be followed in the practice of my invention. In the following discussion, reference is made to system components, and it is assumed that the system is configured as described above.

Feasibility Study

Before the full-scale metal recovery and recycling process is carried out at the site, I recommend that a feasibility study be performed to optimize the treatment regime. The objective of the feasibility study is to provide information about the optimal concentration of leaching agent in the leaching solution, whether it is necessary or desirable to add an anti-complexing agent to the leaching solution, and the amount of time necessary to complete the leaching process and recover the desired amount of the target metal contaminant. Prior to performing either feasibility tests or full-scale treatment of the contaminated soil, it is necessary to identify the target pH for the leaching solution (i.e. the pH at which the target metal contaminant is soluble) and the pH at which the target metal contaminant will precipitate out of solution. These values depend on the chemistry of the particular target metal contaminant and can be determined from basic chemical principles.

The basic procedure for the feasibility test is as follows. Test leaching solutions should be used which contain the leaching agent in various concentrations, and may also contain additives such as an anti-complexing agent. Samples of the contaminated soil are placed in columns and each is treated with a different test leaching solution for 80 hours. The concentration of metal contaminant in the solution and in the soil should be measured following this step. Tests for measuring the concentration of metal contaminants in soil and water, as used here and at later points during the treatment procedure, are well known to those skilled in the art. The sample should then be treated with a weak solution of nitric acid (pH 2.0) for 24 hours, following which the solution and the sample are again tested for metals.

Additional tests can be performed to determine the optimal procedure for precipitating the target metal contaminant from the leaching solution. Samples of leaching solution are taken, and the degree of target metal contaminant precipitation is evaluated for various combinations of pH and organic reducing agent. After the optimal parameters for the leaching and precipitation procedure have been determined, my inventive system can be set up at the site and decontamination of the contaminated site can be carried out as described below.

Initial Test for Metals

Basins 1 and 2 are filled with the contaminated soil. Prior to the addition of any fluid (including water) to the basins, a composite sample of the soil in each basin should be collected and tested for metal contaminant(s). Tests include the EPA TCLP test (Leachable Metals) and tests for total metals present which are considered contaminants.

Leaching

Water is pumped into initial basin 1. The leaching solution (which may include additives, as described below) is added slowly to initial basin 1 until the pH reduction necessary to solubilize the target metal contaminant(s) is attained. This step will typically follow the test for basin liner leakage, so the water can simply be pumped from swap basin 2 to initial basin 1. The leaching solution is then allowed to sit in initial basin 1 for a period of 24 hours. In this manner, the contaminated soil in basin 1 is subjected to the leaching solution for leaching of metal contaminant.

At the end of 24 hours, the leaching solution is pumped from initial basin 1 to swap basin 2 and allowed to sit in the swap basin 2 for a period of 24 hours. In this manner, the contaminated soil in basin 2 is subjected to the leaching solution for leaching of metal contaminant from the soil. While the leaching solution is sitting in the swap basin 2, a composite sample is collected from the soil in initial basin 1 and measured for the metal contaminant(s). The leaching solution is then pumped back into initial basin 1 from the swap basin 2, and while the leaching solution sits in initial basin 1, a composite sample is collected from swap basin 2 and measured for the metal contaminant(s). If the metal contaminant concentration of the samples has been reduced to the target level (i.e. to a desired level as determined by the practitioner), the leaching process is considered complete and the leaching solution is pumped to the metal recovery subsystem. If a further reduction of metal contaminant concentration is required to reach the target level, the leaching solution is allowed to sit in initial basin 1 for 24 hours and then transferred to swap basin 2 for an additional 24 hours, following which metal contaminant measurements are again performed. The procedure is repeated until the concentration of metal contaminant in the soil in the basins has been reduced to the desired level.

Separation

When the leaching process is completed, the leaching solution is pumped from initial basin 1 to precipitation tank 7. The air operated mixer is turned on and after five minutes a sample of the leaching solution is collected for target metal contaminant concentration analysis. The pH of the leaching solution is adjusted to the hydrogen ion concentration required for selective precipitation of the target metal contaminant(s) by the addition of magnesium hydroxide or other precipitation agent. The mixer is left on during the pH adjustment step. The leaching solution is allowed to remain in precipitation tank 7 for five minutes. If the pH changes, it is re-adjusted to the desired pH level by the addition of more magnesium hydroxide or other precipitation agent.

An organic reducing agent is added to the pH adjusted solution in precipitation tank 7. The leaching solution in precipitation tank 7 is pumped through filter press 11 or other separation means for physical separation of precipitated metal contaminant from the leaching solution. The filtrate (metal contaminant is transferred to containers 13 for recycling. Leaching solution from filter press 11 is transferred (e.g. pumped) to recirculation tank 12. When precipitation tank 7 is empty, the air operated mixer is turned off. The leaching solution in recirculation tank 12 is tested for target metal contaminant concentration. If the target metal contaminant concentration is above the target concentration (i.e. a desired level determined by the practitioner), the leaching solution is returned to precipitation tank 7 and the precipitation and physical separation steps are repeated.

When the metal contaminant concentration in the leaching solution in recirculation tank 12 has been reduced to the target level, the solution is pumped from recirculation tank 12 into swap basin 2 via lines 34 and 21. If additional untreated leaching solution remains in initial basin 1 it is then pumped into precipitation tank 7. The precipitation and physical separation steps are then repeated until all leaching solution from initial basin 1 has been treated and transferred to swap basin 2.

Confirmatory Sampling

Following completion of the precipitation and separation process, the percent of metal contaminant in the metal concentrate (sludge) recovered from filter press 11 (or other physical separation means) is measured. A composite sample is collected from swap basin 2 and the metal contaminant concentration in the soil in swap basin 2 is determined. The leaching solution is then pumped from initial basin 1 to swap basin 2, and a composite sample is taken from initial basin 1 for measurement of metal contaminant concentration in the soil of basin 1.

Stabilization

The leaching solution is pumped from swap basin 2 to initial basin 1, and the pH of the leaching solution is dynamically adjusted to 10.0 by the addition of additional leaching agent. The leaching solution pH of 10.0 (in this embodiment of the invention) is necessary to raise the pH in the soil in the basins to the 7.0 to 7.5 range. The leaching solution is pumped from basin to basin until the pH in the soil in both basins is in the desired range. The treatment of the soil is then complete; the metal contaminant(s) have been removed and the pH has been returned to a desired level, in this case neutral, so the treated soil can be safely returned to the areas from which it was removed (or any other site desired). This is referred to as soil stablization.

The leaching solution is then pumped through a stripping filter which removes trace metal contaminants. The stripped leaching solution should meet drinking water standards for metal contaminant concentrations. The solution can then be safely drained into a sewer or otherwise disposed of. If nitric acid is used as the leaching agent and if magnesium hydroxide is used as the precipitation agent, then the stripped solution will contain magnesium nitrate which makes the solution useful as an aquaculture feedstock.

SOLUTIONS AND CHEMICALS

A solution of nitric acid (the leaching agent) and 20 percent hydrogen peroxide is added to the water in the basins to produce the leaching solution. The concentration of nitric acid which is used in the preferred embodiment of my invention ranges from 20 to 40 percent depending upon the particular application. This leaching agent solution is added to the water in a quantity sufficient to adjust the pH of the leaching solution such that the target metal contaminant will go into solution. The preferred pH for the leaching solution is determined in the feasibility study described above. Hydrogen peroxide serves as an anti-complexing agent which prevents the formation of insoluble metal complexes. Thus, the hydrogen peroxide facilitates the dissolution of the metal contaminants into the leaching solution. It is preferred that ethylenediaminetetraacetic acid (EDTA) be used as an anti-complexing agent if the target metal is lead. Either or both of these anticomplexing agents or other anticomplexing agents may be used, depending on the particular target metal contaminants in the soil.

The precipitation agent used in the practice of my invention consists of a solution magnesium hydroxide which, when added to the leaching solution, brings the leaching solution to the pH at which the target metal contaminant react with the organic reducing agent and precipitates out of solution.

Several reducing agents can be used in the practice of my invention. The selection of reducing agent for a particular application can be made from the feasibility study described above. The reducing agents used in my invention include organic reducing agents such as DWT-1107L "Organic Metal Precipitant", which is available from Dover Technology, and "Metal Reducing Agent" (MRA), available from Emchem. Amine functionalities and sulsulfur-hydrogen complexes on the organic reducing agents affect their ability to react with the metal contaminant in the leaching solution. The metal contaminant combines with amine functionalities in the organic reducing agents. The more reactive aminated metal contaminant is hydrogenated through reaction with the hydrogen of the sulfur-hydrogen complex, and finally is oxidized. Although I prefer to use DWT-1107L "Organic Metal Precipitant" or "Metal Reducing Agent" (MRA) from Emchem in the practice of my invention, other organic reducing agents, or most generally, other cationic reducing agents, with similar properties can be used in the practice of my invention, as well. Even more generally, the reducing agent can be any agent which reacts with the target metal contaminant to produce a form of the metal contaminant that can be physically separated from the leaching solution.

System Components

The system can use standard chemical resistant air and electrically operated pumps which can pump 2 to 200

(gallons/minute). The precipitation tank 7 is a sloped tank (500 to 4,000 gallon capacity) conventional tanks can be used to hold the leaching agent, precipitation agent and reducing agent. The above described components are used in the preferred embodiment of the invention. However, any or all of these components may be varied or replaced by components which serve the function and purposes of the invention without departing from the essential nature of the invention.

Experimental Project

Figure 4:
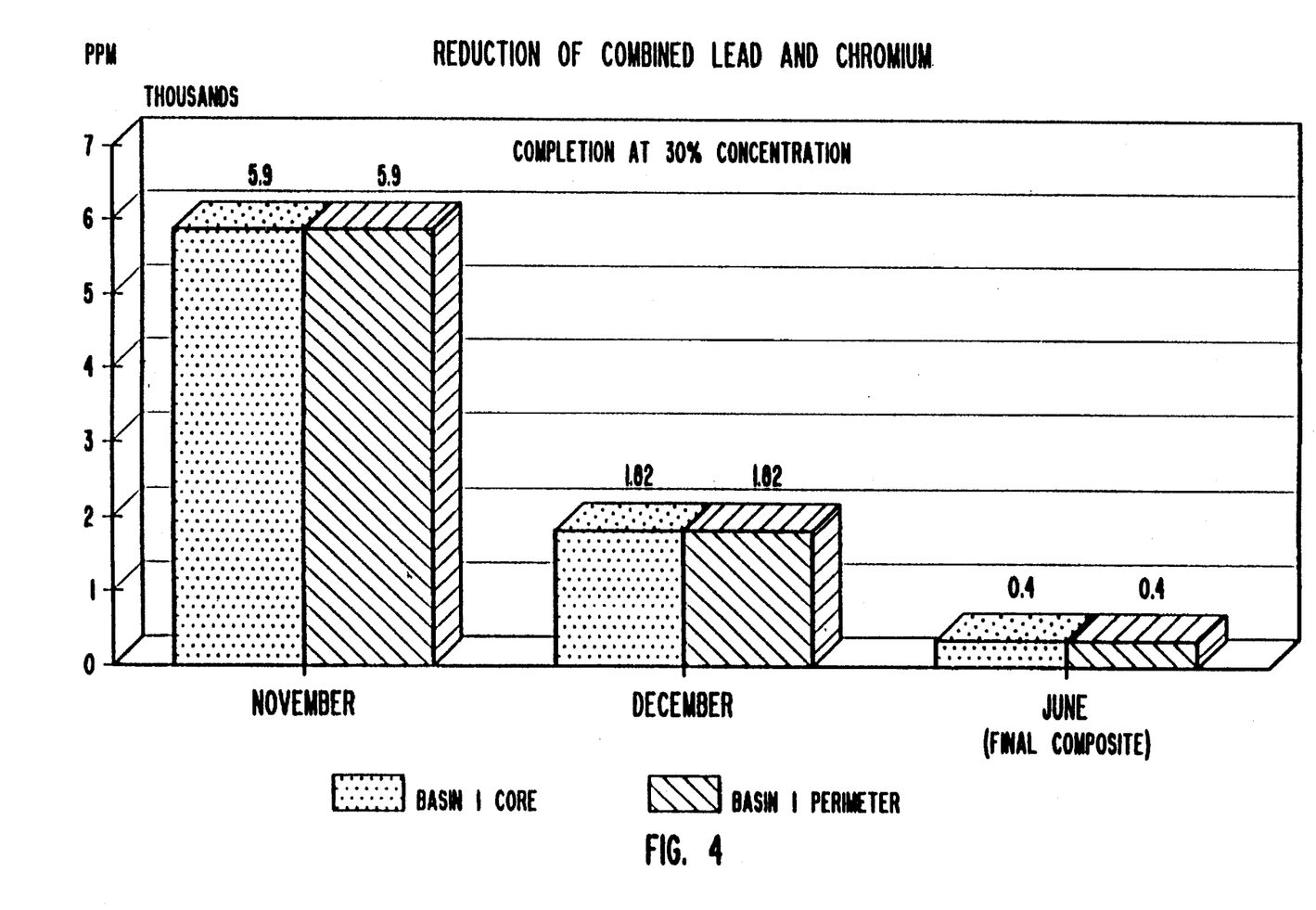
FIG. 4 is a bar-graph plotting the Reduction of Combined Lead and Chromium in thousands of parts per million, at three separate times using 15% nitric acid as the leaching agent.
Figure 5:
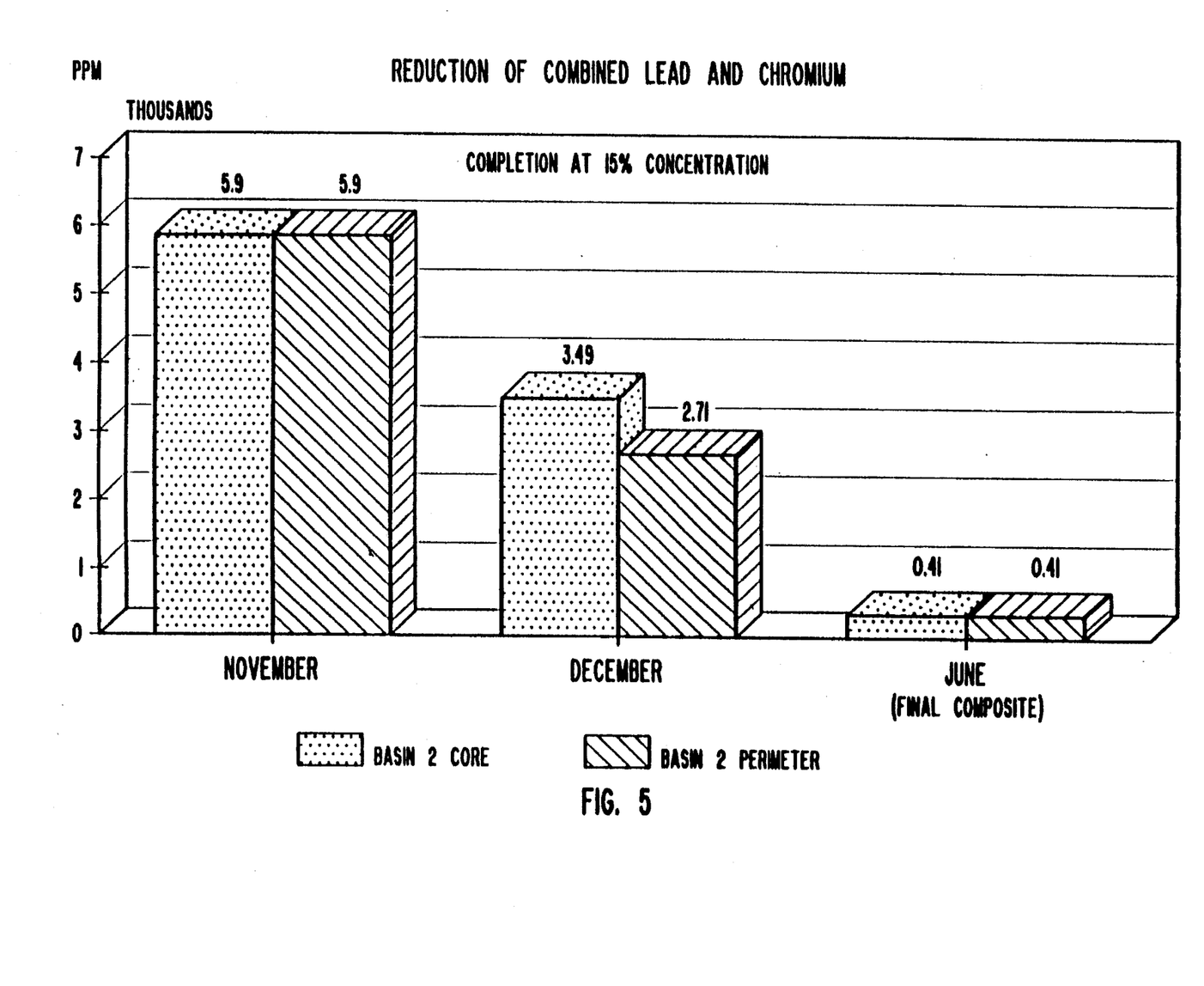

FIGS. 4 and 5 report the results of an experimental project for the decontaminantion of metal contaminated soil at an industrial site in the Salt Lake City area. The target metal contaminants were lead and chromium. The project was conducted from November 1990 to June 1991. The 30% and 15% concentrations in FIGS. 4 and 5 respectively refer to the concentration of leaching agent (nitric acid). As indicated by these graphs, the total metals concentration of lead and chromium in the soil of Basin 1 was reduced to 400 ppm and the total metals concentration of lead and chromium in the soil of Basin 2 was reduced to 410 ppm.

In addition to measuring the concentration of metal contaminants in the soil, it is important to measure for leachable metal contaminants. For this purpose, the Toxicity Characteristic Leaching Procedure (TCLP), an EPA wet test, was used to measure leachable metals on May 22, 1991. Sample results are set forth in Tables 1 and 2 below.

TABLE 1

Basin 1 - Sample from Perimeter (1.5 ft. depth)

| | ANALYTICAL RESULTS | | |
|---|---|---|---|
| | EPA METHOD USED: | DETECTION LIMIT mg/L | AMOUNT DETECTED mg/L |
| TCLP METALS | 1311 | | |
| Arsenic | 7060 | 0.5 | <0.5 |
| Barium | 6010 | 5.0 | <5.0 |
| Cadmium | 6010 | 0.1 | <0.1 |
| Chromium | 6010 | 0.5 | <0.5 |
| Lead | 6010 | 0.1 | 0.82 |
| Mercury | 7471 | 0.05 | <0.05 |
| Selenium | 7740 | 0.1 | <0.1 |
| Silver | 6010 | 0.5 | <0.5 |

TABLE 2

Basin 2 - Sample from Core (1.0 ft. depth)

| | ANALYTICAL RESULTS | | |
|---|---|---|---|
| | EPA METHOD USED: | DETECTION LIMIT mg/L | AMOUNT DETECTED mg/L |
| TCLP METALS | 1311 | | |
| Arsenic | 7060 | 0.5 | <0.5 |
| Barium | 6010 | 5.0 | <5.0 |
| Cadmium | 6010 | 0.1 | <0.1 |
| Chromium | 6010 | 0.5 | <0.5 |
| Lead | 6010 | 0.1 | 0.99 |
| Mercury | 7471 | 0.05 | <0.05 |
| Selenium | 7740 | 0.1 | <0.1 |
| Silver | 6010 | 0.5 | <0.5 |

These results and measurements for other samples taken from the basins indicate that any leaching of the target metal contaminants (lead and chromium) and other listed metals are below enviromentally unsafe levels.

The foregoing description of the invention and the drawings so fully reveal the general nature and the innovations and advantages of the invention that others can readily modify such invention and/or adapt it for various applications without departing from its general concepts, and, therefore such adaptations and modifications should be and are intended to be comprehended within the meaning and range of the claims appended hereto and their equivalents, which claims define subject matter regarded to be the invention described herein.

I claim:

1. A method for decontamination of a soil contaminated with a metal contaminant, said method comprising:

(a) placing the contaminated soil in an initial basin and a swap basin, (b) adding a leaching solution to the initial basin, said leaching solution being effective for leaching of said metal contaminant from the soil, (c) leaching of the metal contaminant by said leaching solution from the soil in the initial basin, (d) transferring said leaching solution from the initial basin to the swap basin, and (e) leaching of the metal contaminant by said leaching solution from the soil in the swap basin.

2. A method in accordance with claim 1 further comprising:

(f) transferring said leaching solution back to the initial basin, and repeating step (c).

3. A method in accordance with claim 2 further comprising:

(g) repeating steps (d) and (e).

4. A method in accordance with claim 3 wherein steps (f) and (g) are repeated until the metal contaminant in the soil in the basins is reduced to a desired concentration.

5. A method in accordance with claim 4 wherein said leaching solution is transferred to a separation means after said desired concentration is reached; and wherein said separation means is a means for separating the metal contaminant from said leaching solution.

6. A method in accordance with claim 1 further comprising:

(f) transferring said leaching solution to a precipitation tank, (g) adjusting the pH of said leaching solution to a pH required for precipitation of the metal contaminant from said leaching solution, (h) precipitation of the metal contaminant from said leaching solution, and (i) transferring said leaching solution and precipitated metal contaminant from said precipitation tank to a physical separation means for physically separating precipitated metal contaminant from said leaching solution.

7. A method in accordance with claim 6 further comprising:

(j) returning said leaching solution from said separation means to said precipitation tank to repeat (h) and (i).

8. A method in accordance with claim 7 further comprising:

(k) repeating (h), (i) and (j) until the concentration of the metal contaminant in said leaching solution is reduced to a desired level.

9. A method in accordance with claim 8 further comprising:

(l) after said metal contaminant concentration is reduced to the desired level, returning said leaching solution to at least one of said basins for further leaching of metal contaminant.

10. A method in accordance with claim 6 wherein said pH is adjusted by the addition of a precipitation agent to said leaching solution.

11. A method in accordance with claim 6 wherein said separated precipitated metal contaminant is separated for recycling.

12. A method in accordance with claim 6 further comprising:

(j) transferring said leaching solution from said physical separation means to a recirculation tank.

13. A method in accordance with claim 12 further comprising:

(k) returning said leaching solution from said recirculation tank to said precipitation tank to repeat (h), (i) and (j).

14. A method in accordance with claim 13 further comprising:

(l) repeating (h), (i), (j) and (k) until the concentration of the metal contaminant in said leaching solution is reduced to a desired level.

15. A method in accordance with claim 14 further comprising:

(m) after said metal contaminant concentration is reduced to the desired level, returning said leaching solution to at least one of said basins for further leaching of metal contaminant.

16. A method in accordance with claim 6 wherein the metal contaminant is at least one member selected from the group consisting of arsenic, barium, cadmium, chromium, lead, mercury and silver.

17. A method in accordance with claim 15 further comprising stabilization of the soil.

18. A method for decontamination of a soil contaminated with a metal contaminant, said method comprising:

(a) putting the contaminated soil into a basin, (b) introducing a leaching solution into said basin, said leaching solution being effective for leaching of the metal contaminant from the soil, (c) leaching of the metal contaminant by said leaching solution from the soil in said basin, (d) transferring said leaching solution from said basin to a precipitation tank, (e) adjusting the pH of said leaching solution to a pH required for precipitation of the metal contaminant from said leaching solution, (f) precipitation of the metal contaminant from said leaching solution, and (g) transferring said leaching solution and precipitated metal contaminant from said precipitation tank to a physical separation means for physically separating precipitated metal contaminant from said leaching solution;

wherein (f) includes adding an organic reducing agent to the leaching solution for reaction with the metal contaminant.

19. A method for decontamination of a soil contaminated with a metal contaminant, said method comprising:

(a) putting the contaminated soil into a basin, (b) introducing a leaching solution into said basin, said leaching solution being effective for leaching of the metal contaminant from the soil, (c) leaching of the metal contaminant by said leaching solution from the soil in said basin, (d) transferring said leaching solution from said basin to a precipitation tank, (e) adjusting the pH of said leaching solution to a pH required for precipitation of the metal contaminant from said leaching solution, (f) precipitation of the metal contaminant from said leaching solution, and (g) transferring said leaching solution and precipitated metal contaminant from said precipitation tank to a physical separation means for physically separating precipitated metal contaminant from said leaching solution;

wherein said method includes a feasibility study to determine:

i. a leaching solution pH at which the metal contaminant is soluble during (c), ii. selection of leaching agent for said leaching solution, iii. concentration of leaching agent in leaching solution, iv. a leaching solution pH for precipitation during (f), v. selection of precipitation agent, if any, and vi. selection of reducing agent, if any.

20. A method for decontamination of a soil contaminated with a metal contaminant, said method comprising:

(a) putting the contaminated soil into a basin, (b) introducing a leaching solution into said basin, said leaching solution being effective for leaching of the metal contaminant from the soil, (c) leaching of the metal contaminant by said leaching solution from the soil in said basin, (d) transferring said leaching solution from said basin to a precipitation tank, (e) adjusting the pH of said leaching solution to a pH required for precipitation of the metal contaminant from said leaching solution, (f) precipitation of the metal contaminant from said leaching solution, (g) transferring said leaching solution and precipitated metal contaminant from said precipitation tank to a physical separation means for physically separating precipitated metal contaminant from said leaching solution, and (h) stabilization of the soil.

* * * * *